(12) United States Patent
Nicol et al.

(10) Patent No.: US 7,486,727 B2
(45) Date of Patent: Feb. 3, 2009

(54) RECONFIGURABLE COMMUNICATIONS CIRCUIT

(75) Inventors: Christopher John Nicol, New South Wales (AU); Tomasz T. Prokop, New South Wales (AU); Dominic Wing-Kin Yip, New South Wales (AU)

(73) Assignee: Agere Systems Inc., Allentown, PA (US)

( * ) Notice: Subject to any disclaimer, the term of this patent is extended or adjusted under 35 U.S.C. 154(b) by 691 days.

(21) Appl. No.: 11/107,049

(22) Filed: Apr. 15, 2005

(65) Prior Publication Data

US 2006/0233229 A1 Oct. 19, 2006

(51) Int. Cl.
*H03K 5/159* (2006.01)
(52) U.S. Cl. .................... 375/232; 375/147; 375/347
(58) Field of Classification Search ............. 375/232, 375/147, 347; 333/18, 28
See application file for complete search history.

(56) References Cited

U.S. PATENT DOCUMENTS

| 3,829,777 | A | * | 8/1974 | Muratani et al. ............... 455/8 |
| 5,822,100 | A | * | 10/1998 | Robinson et al. ............ 398/147 |
| 2002/0018529 | A1 | * | 2/2002 | Dabak et al. ................. 375/267 |
| 2003/0012318 | A1 | * | 1/2003 | Piirainen .................... 375/358 |

OTHER PUBLICATIONS

Nicol et al., "Reconfigurable Communications Circuit Operable with Data Channel and Control Channel," U.S. Appl. No. 11/166,042, filed Jun. 24, 2005.

Santoso et al., "A Chip level Decision Feedback Equalizer for CDMA Downlink Channel with the Alamouti Transmit Diversity Scheme," The 14th IEEE International Symposium on Personal, Indoor and Mobile Radio Communication Proceedings, pp. 1322-1326 (2003).
Alamouti, S.M., "A Simple Transmit Diversity Technique for Wireless Communications," IEEE Journal on Select Areas in Communications, vol. 16, No. 8, pp. 1451-1458, (Oct. 1998).
Lenardi, et al., "Comparison of Downlink Transmit Diversity Schemes for RAKE and SINR Maximizing Receivers," IEEE ICC 2001 Conference Proceedings (2001).
Frank, C.D., "MMSE Reception of DS-CDMA with Open-Loop Transmit Diversity," 3G Mobile Communication Technologies Conference Publication No. 477, pp. 156-160, (Mar. 2001).
Hooli, K., "Equalization in WCDMA Terminals," Oulu University Press, Oulu (2003).
Anonymous, "3rd Generation Partnership Project; Technical Specification Group Radio Access Network; Spreading and modulation (FDD), 3GPP TS 25.213, V5.5.0" (Dec. 2003).

(Continued)

*Primary Examiner*—Shuwang Liu
*Assistant Examiner*—Michael R Neff
(74) *Attorney, Agent, or Firm*—Ryan, Mason & Lewis, LLP

(57) ABSTRACT

A communications circuit can operate in a first mode, such as a diversity mode including space time transmit diversity (STTD). In this mode, a number of equalizer filter portions connected to a number of post-equalizer processors are employed. When the diversity mode is not required, the extra equalizer filter portions would represent a waste of power consumption and/or chip space. A combining circuit and suitable control circuitry are provided to allow use of the additional equalizer filter portions to be made in other operating modes. Appropriate trade-offs can be made based on power consumption and performance.

22 Claims, 9 Drawing Sheets

OTHER PUBLICATIONS

Anonymous, "3rd Generation Partnership Project; Technical Specification Group Radio Access Network; Physical channels and mapping of transport channels onto physical channels (FDD), 3GPP TS 25.211, V5.6.0" (Sep. 2004).

* cited by examiner

US 7,486,727 B2

RECONFIGURABLE COMMUNICATIONS CIRCUIT

FIELD OF THE INVENTION

The present invention relates generally to communications circuits, and more particularly relates to a circuit that is reconfigurable to operate in at least first and second operating modes.

BACKGROUND OF THE INVENTION

Mobile wireless communications devices typically employ diversity, a technique used to compensate for fading. In space diversity, multiple transmit antennas are employed, spaced so that the signals from each transmit antenna to receive antenna are likely to be uncorrelated with each other. In time diversity, information is repeatedly transmitted at time spacings that exceed the coherence time of the communications channel; consequently, multiple representations of the symbol are received under independent fading conditions, thus providing diversity. Space time transmit diversity (STTD) employs both space and time diversity.

Diversity schemes, such as STTD, may employ two or more equalizer filters running in parallel off the same filter delay line, each with a corresponding post-equalizer processor such a descrambler/despreader. Each equalizer filter and post-equalizer processor is typically implemented in a separate hardware block on an integrated circuit chip. Since the primary diversity mode, such as STTD, is not always used, the additional equalizer filter(s) and post-equalizer processor(s) represent a waste of space and power. Solutions have been proposed which partially address the power consumption issue, but these have disadvantages, and have not addressed the waste of space on the integrated circuit chip.

Accordingly, it would be desirable to provide a reconfigurable communications circuit where use can be made of the hardware blocks for the extra equalizer filter(s) when not in the primary diversity mode, making appropriate trade-offs between performance and power consumption.

SUMMARY OF THE INVENTION

The present invention, in an illustrative embodiment, addresses the needs identified in the prior art. In one aspect, an exemplary communications circuit is operable in at least first and second operating modes. The circuit can include N equalizer filter portions and N post-equalizer processors, where N is an integer greater than or equal to 2. The circuit can also include a combining circuit that is interconnected between outputs of the equalizer filter portions and inputs of the post-equalizer processors. The combining circuit can couple each of the equalizer filter portion outputs to a corresponding post-equalizer processor input in the first operating mode, and can then couple the equalizer filter portion outputs to some different number of post-equalizer processor inputs in the second operating mode.

In another aspect, an exemplary method of operating a communications circuit can include the steps of operating the circuit in a diversity mode configuration using N equalizer filter portions coupled to N post-equalizer processors, and, responsive to a command, reconfiguring the circuit into a second mode where the N equalizer filter portions are coupled to fewer than N post-equalizer processors. The N equalizer filter portions can be used to operate the circuit in the second mode configuration.

A more complete understanding of the present invention, as well as further features and advantages of the present invention, will be obtained by reference to the following detailed description and drawings.

DETAILED DESCRIPTION

Figure 1:
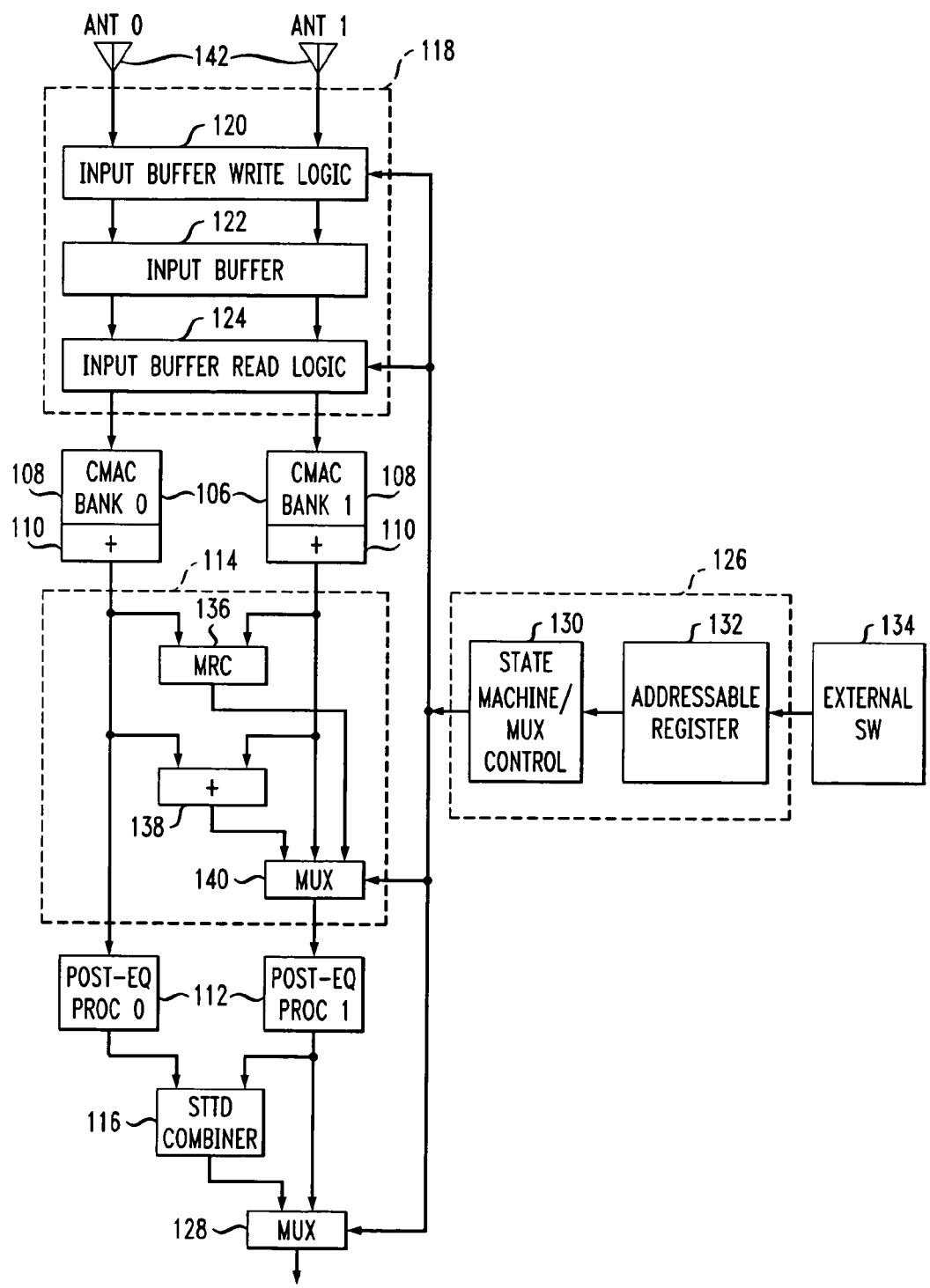
FIG. 1 is a block diagram depicting an embodiment of a circuit and apparatus according to the present invention.

Reference should now be had to FIG. 1 which depicts an inventive apparatus including an inventive communications circuit in accordance with one aspect of the present invention, suitable for use, e.g., in a wireless receiver. The circuit is operable in at least first and second operating modes. The circuit includes N equalizer filter portions 106. N is an integer greater than or equal to 2; in the illustrative embodiment, N is equal to 2. Equalizer filter portions 106 can optionally include a bank of complex multiply accumulate circuits 108 and a complex adder 110 that adds together the outputs of the complex multiply accumulate circuits in the respective circuit banks. Each of the equalizer filter portions 108 can include an input and an output. The inventive circuit can further include N post-equalizer processors 112, each again typically having an input and an output symbolized by the arrows. The inventive circuit can also include a combining circuit 114 interconnected between the outputs of equalizer filter portions 106 and the inputs of post-equalizer processors 112. The combining circuit 114 can be configurable to couple each of the outputs of the equalizer filter portions 106 to a corresponding one of the inputs of the post-equalizer processors 112 in a first operating mode. That is, in the first operating mode, each equalizer filter portion 106 is connected to its corresponding post-equalizer processor 112. Combining circuit 114 is also configurable to couple the outputs of the equalizer filter portions 106 to L post-equalizer processor inputs of the post-equalizer processors 112 in the second operating mode. L in an integer less than N; in the example shown in FIG. 1, L equals 1. Accordingly, in the second operating mode, while the first post-equalizer processor 112 may not be used, use can be made of both equalizer filter portions 106, thereby making more efficient use of circuit die area and/or power. Note that, in general, L represents the number of post-equalizer processors that are to be used in the second operating mode.

Note that, as used herein, the word "coupled" includes both direct interconnection, and indirect interconnection (i.e., through another component). Further, unless indicated otherwise, "coupling" includes both permanent and selective (that is, through a switch or multiplexer) coupling.

The circuit can further include a first mode combiner module 116 that is configurable to be coupled to the N outputs of the post-equalizer processors 112 for the first operating mode. The first operating mode will typically be a diversity mode, such as an STTD mode. In such case, the first mode combiner module 116 can be an STTD combiner as shown in the exemplary embodiment in FIG. 1. The circuit can still further include an input buffer module 118 that is coupled to the inputs of the equalizer filter portions 106 and is reconfigurable between a first virtual delay line configuration associated with the first operating mode and a second virtual delay line configuration associated with the second operating mode. Note that the inventive circuit may operate in more than two modes, and thus, the input buffer module 118 may be reconfigurable between a number of virtual delay line configurations. Input buffer module 118 can optionally include input buffer write logic 120, input buffer 122, and input buffer read logic 124. The read logic 124 can be coupled to the inputs of the equalizer filter portions 106. Write logic 120, buffer 122, and read logic 124 are coupled to each other through appropriate interconnections.

Yet further, the circuit can include a control circuit 126 that is coupled to input buffer module 118, most preferably to write logic 120 and read logic 124. Control circuit 126 can be interconnected with combining circuit 114 and, for example, a suitable multiplexer 128. Control circuit 126 can control multiplexer 128 so as to cause the output of the circuit to be taken from the first mode combiner module 116 during the first operating mode, and from the output of the second post-equalizer processor 112 in the second operating mode. Note that the first equalizer filter portion 106 and first post-equalizer processor 112 are designated as "0" while the second equalizer filter portion 106 and post-equalizer processor 112 are designated as "1." The control circuit 126 can also be configurable to switch the input buffer module 118 and the combining circuit 114 between the first and second operating modes, and any additional operating modes. Control circuit 126 can optionally include a state machine/multiplexer control 130 and an addressable register 132. The addressable register 132 can be can be configured to receive appropriate signals from, for example, an external source such as external software 134 which causes the circuit to configure itself in the appropriate manner for the desired operating mode.

Combining circuit 114 can optionally include a maximum ratio combiner 136 and/or a complex adder 138. Combiner 136 and adder 138 can each have appropriate input port coupled to the outputs of the equalizer filter portions 106, and can have appropriate outputs interconnected, preferably in a selective manner, to the input of the second post-equalizer processor 112. Such selective interconnection can be provided, for example, by a multiplexer 140.

Elements 106 through 132 and 136 through 140 can typically be implemented on a single integrated circuit chip, on which the inventive circuit is formed. The chip can have appropriate interconnections so that addressable register 132 can receive input such as from external software 134. The circuit discussed to this point can be part of a larger apparatus that includes a plurality of antenna modules coupled to input ports of the input buffer module 118, such as input ports of input buffer write logic 120. As used herein, the term "antenna module" refers to an antenna plus appropriate interconnections, and will be discussed more fully with respect to FIG. 13 below. Antenna modules are suggested in FIG. 1 by the antennas 142.

With reference to input buffer module 118, and input buffer 122, as noted, the buffer module 118 is reconfigurable to provide a number of different virtual delay line configurations corresponding to the different operating modes. It will be appreciated that this can be accomplished by splitting the input buffer 122 into a number of physical buffers merged into a single virtual buffer by address translation. Such address translation can be performed by the input buffer write logic 120 and the input buffer read logic 124. For example, when the input buffer 122 includes two physical buffers, and when M chips of data are available, one can accept an address in the range 0, M-1 and each physical buffer can hold M/2 chips, with the logic translating the input address to enable signals to access the two physical buffers. The read logic 124 could be provided with a multiplexer, for example, to determine which of the two physical buffers one read the data from.

Operation of the circuit and apparatus of FIG. 1 in a number of different possible configurations will now be discussed. With reference to FIGS. 1-5; note that elements in each of FIGS. 2-5 that are similar to those in FIG. 1 are incremented by, respectively, 100, 200, 300 & 400. Note also that a "chip" is a data symbol multiplied by, for example, a spreading code when using, for example, Code Division Multiple Access (CDMA). In an STTD configuration such as specified by the Third Generation Partnership Project (3GPP) Universal Mobile Telecommunications System (UMTS) Technical Specification 25.211, the chip may have further been multiplied with a complex scrambling code. This is described in 3GPP standard 25.213.

Figure 2:
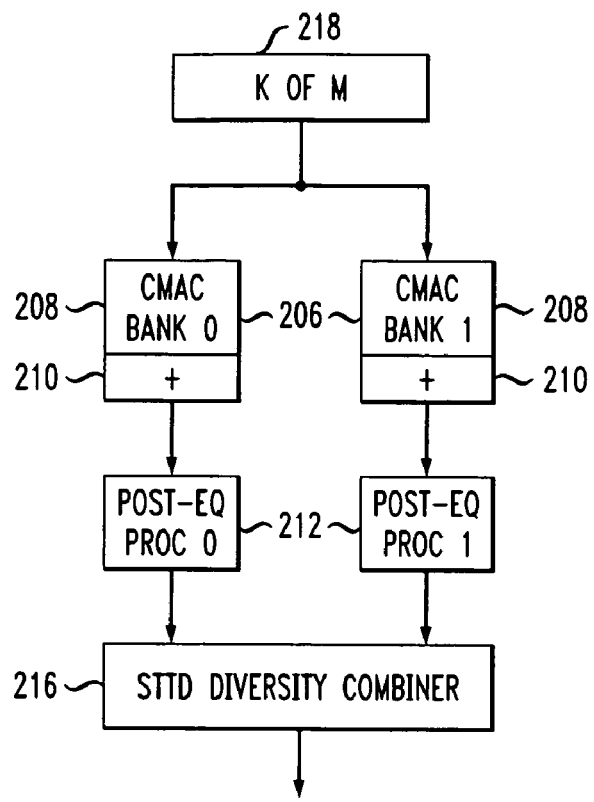
FIG. 2 is a block diagram depicting operation of the circuit of FIG. 1 in a first operating mode.

With continued reference to FIG. 1, and referring now to FIG. 2, in a first mode of operation (preferably a primary diversity mode and most preferably an STTD mode), the virtual delay formed by input buffer module 118 includes K samples of the M data chips. K should be less than M. Note that as used herein, "primary diversity mode" refers to a mode of operation employing diversity wherein substantially all the equalizer filter portions and post-equalizer processors are in use by design. Other operating modes besides the primary mode may also make use of diversity. Multiplexer 140 of combining circuit 114 feeds output of the second equalizer filter portion 106 directly to the second post-equalizer processor 112, and the outputs of both equalizer processors are then sent to first mode combiner 116. Multiplexer 128 selects the circuit output from the first mode combiner 116 output.

Figure 3:
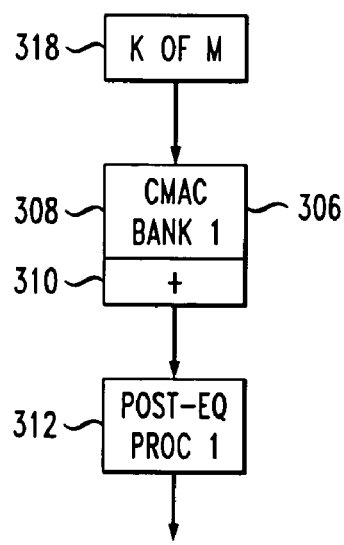
FIG. 3 is a block diagram depicting operation of the circuit of FIG. 1 in another operating mode.

Still with reference to FIG. 1, and referring now to FIG. 3, in another mode of operation, buffer module 118 again presents a virtual delay line with K samples of M chips as shown at 318. Multiplexer 140 feeds the output of the second equalizer filter portion 106 directly to the second post-equalizer processor 112, and multiplexer 128 takes the circuit output directly from the second post-equalizer processor 112. Note that the configuration shown in FIG. 3 is a "standard short" configuration which can be formed from the circuit depicted in FIG. 1, and corresponds to simply not using the first equalizer filter portion 106 and post-equalizer processor 112, which is believed to often be relatively undesirable due to the waste of power and chip space discussed above; however, the exemplary inventive circuit can be configured in such a fashion where desirable.

Figure 4:
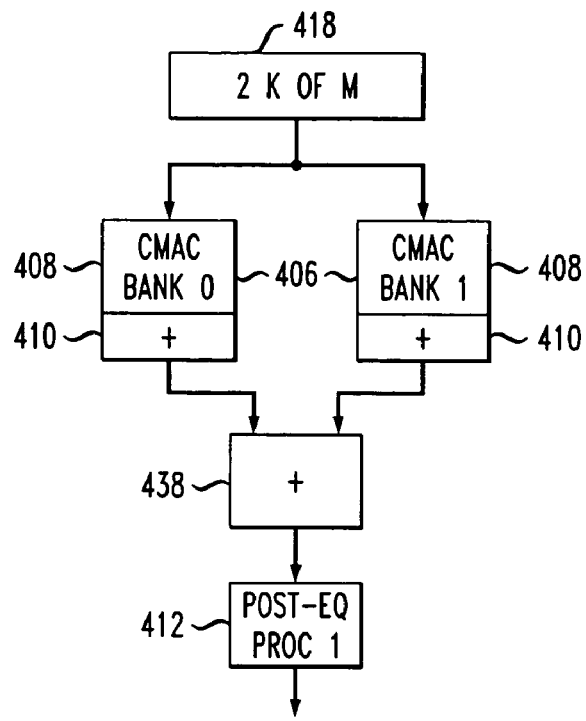
FIG. 4 is a block diagram depicting operation of the circuit of FIG. 1 in yet another operating mode.

Referencing continually to FIG. 1, and now viewing FIG. 4, in yet another operating mode for the inventive circuit, input buffer module 118 can be configured as a virtual delay line holding 2K samples of the M chips, as shown at 418. 2K should be less then M. Multiplexer 140 selects the output of complex adder 138 to feed to second post-equalizer processor 112. This results in the "long" configuration depicted in FIG. 4, wherein the first and second equalizer filter portions 406 effectively function as a single equalizer filter of double length as compared to the length of the first and second equalizer filter portions 406 in the first operating mode as depicted in FIG. 2.

Figure 5:
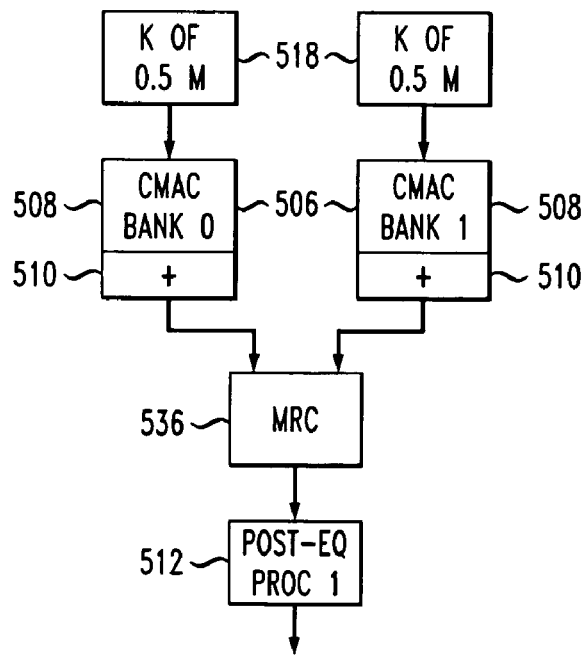
FIG. 5 is a block diagram depicting operation of the circuit of FIG. 1 in still another operating mode.

Still referencing FIG. 1, and giving attention now also to FIG. 5, still another possible operating mode for the inventive circuit of FIG. 1 is depicted. As noted, input buffer 122 can be implemented from a plurality of individual physical buffers. In the present case, input buffer 122 can include two physical buffers each holding K of M/2 available chips. The multiplexer 140 can be selected to feed the output of maximum ratio combiner 136 into the second post-equalizer processor 112. This results in the simple two-way diversity configuration depicted in FIG. 5, that is, it would typically employ space diversity only. Note that the configurations of FIGS. 2, 3, and 4 each use a single antenna 142 (with associated circuitry), while the FIG. 5 configuration would employ two antennas 142 and associated circuitry.

It will be appreciated that the inventive circuit can include any of the desired features depicted to switch between a first operating mode such as that shown in FIG. 2 and any of the other operating modes depicted, and can have a plurality of modes of operation. It will also be appreciated that if desired, one could interconnect the outputs of maximum ratio combiner 136 and complex adder 138 with different post-equalizer processors 112 in different modes; however, it is believed most efficient that both should be connected to the same post-equalizer processor, such as the second post-equalizer processor 112, in order to permit switching between modes through use of a single multiplexer 140.

As noted any number, N, of equalizer filter portions 106 greater than or equal to 2 can be used. In many cases, it may be advantageous to select L, the number of post-equalizer processors to be used in the second mode, to be equal to 1. In this case, one obtains a one by N configuration, that is, in the second mode N equalizer filter portions feed into a single post-equalizer processor.

In other cases, it may be advantageous to have L be an even integer and have the combining circuit configurable to couple an equal number of equalizer filter portions to each of the L post-equalizer processor inputs used in the second operating mode, for example, forming configurations such as 2×2, 2×3, 2×4, 4×2, and the like. The first number would refer to L, while the second number would refer to the number of equalizer filter portions feeding into each of the L post-equalizer processors used in the second mode. It will be appreciated that one or more values of capital L, as well as the various configurations of the combining circuit 114, can be configured and selected based on appropriate engineering trade-offs between performance and power consumption, during different operating conditions that may be expected.

Figure 6:
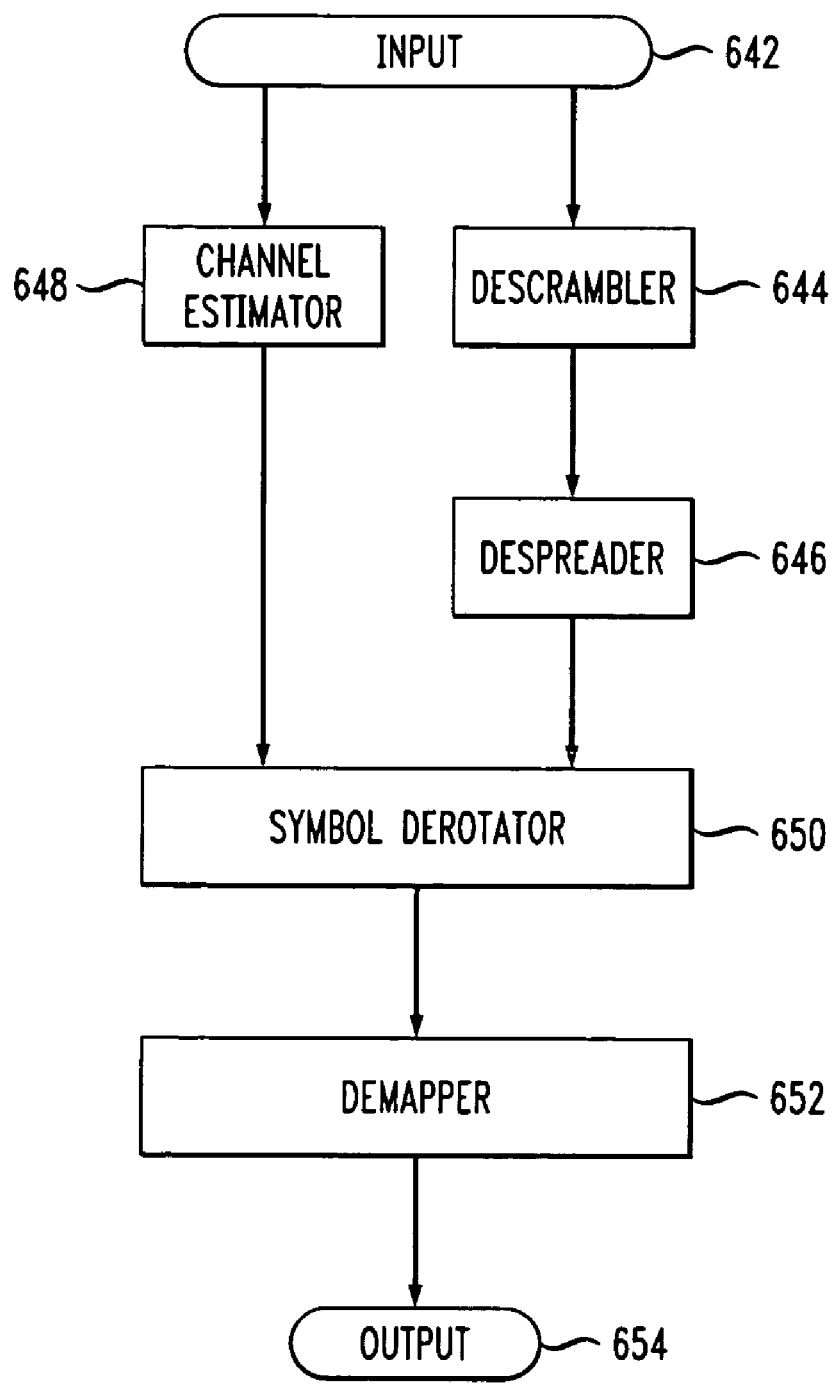
FIG. 6 is a block diagram of a preferred form of post-equalizer processor in accordance with the present invention.

Reference should now be had to FIG. 6, which depicts one preferred form of post-equalizer processor 612 that can be used with the present invention. Processor 612 has an input 642 coupled to a descrambler 644, in turn coupled to a despreader 646. Input 642 is also coupled to a channel estimator 648 in parallel with descrambler 644 and despreader 646. The output from channel estimator 648 and despreader 646 can be fed to a symbol derotater 650 coupled to a demapper 652 producing a desired output 654 for the post-equalizer processor 612. In each case, appropriate inputs and outputs of the elements are suggested by the arrows. Descrambler 644 can multiply the conjugate of the scrambling code employed in the given scheme with the output of the equalizer filter portion 106. Despreader 646 can multiply the output of descrambler 644 with the spreading code, and integrate across a number of data chips equal to the spreading factor. The output of despreader 646 is an estimated symbol with channel distortion. The channel estimator 648 correlates the output of the equalizer filter portion 106 with a pilot channel, which is a downlink channel carrying a pre-defined bit sequence. Such pilot channel is typically broadcast over the entire cell, so that such that user equipment such as mobile phones can determine the channel condition between the equipment and the transmitting antenna. In a case when transmit diversity such as STTD is employed, different bit sequences can be transmitted on the two transmitting antennas. The output of the channel estimator 648 is the phase and amplitude distortion introduced by the channel. Symbol derotater 650 multiplies the conjugate of the output of the channel estimator 648 with the output of the despreader 646. The demapper 652 uses a log-likelihood method to predict the most likely stream of data bits input to it.

Figure 7:
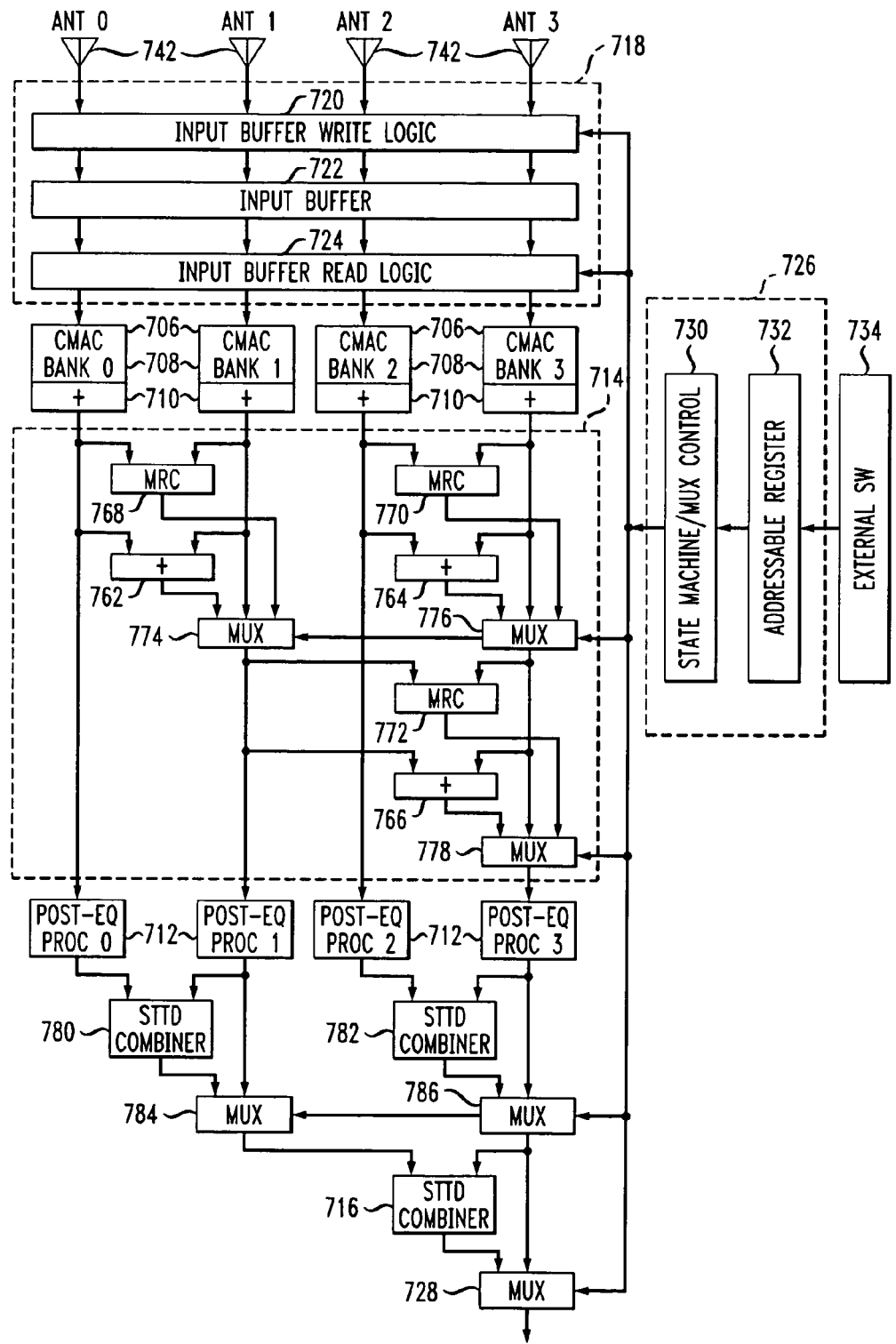
FIG. 7 is a block diagram of an alternative embodiment of circuit and apparatus in accordance with the present invention.

Attention should now be given to FIG. 7, which shows an alternative embodiment of the present invention, also suitable for use, e.g., in a wireless receiver, wherein the number of equalizer filter portions 706 and post-equalizers processors 712, N, is equal to 4. Note that the first through fourth post-equalizer processors are numbered 0, 1, 2, and 3 and that elements in FIG. 7 similar to those in FIG. 1 have received the same reference character incremented by 600. In the embodiment of FIG. 7, combining circuit 714 has additional elements as compared to combining circuit 114 due to the additional hardware. Specifically, combining circuit 714 can include a maximum ratio combiner configuration formed by maximum ratio combiners 768, 770, 772, and a complex adder configuration formed by complex adders 762, 764, 766. Three (3) multiplexers, 774, 776, 778, can be provided as part of combining circuit 714. Other additional elements can include additional combiners, such as STTD combiners 780, 782, and multiplexers 784, 786. Thus, when operating in a first mode (preferably a primary diversity mode and most preferably an STTD mode, as discussed above) first mode combiner module 716 can be coupled to the first, second, third and fourth post-equalizer processor outputs of processors 712 by selecting the output of combiner 780 with multiplexer 784, the output of combiner 782 with multiplexer 786; the output of the circuit can then be taken from first mode combiner module 716 by selecting it with multiplexer 728. Note that the inputs and outputs of all components are suggested by the arrows in FIG. 7. In the first mode just discussed, each equalizer filter portion 706 can be connected to its corresponding post-equalizer processor portion 712. This can be accomplished by selecting the output of the second equalizer filter portion 706 with multiplexer 774, the output of fourth equalizer filter portion 706 with multiplexer 776, and the direct output of multiplexer 776 with multiplexer 778. Each of the multiplexers can be coupled to the control circuit 726.

Operation of the circuit of FIG. 7 in a number of different possible configurations will now be discussed with reference to FIGS. 7-12; elements in each of FIGS. 8-12 that are similar to those in FIG. 7 have received the same reference character incremented by, respectively, 100, 200, 300, 400, and 500. It will be appreciated that in the first mode of operation just described, L equals 1. With continued reference to FIG. 7, and referring now also to FIG. 8, the configuration of N equals 4 and L equals 1 just described is depicted, and it will be appreciated that the virtual delay line configuration formed by the input buffer includes K of M available chips as shown at block 818.

Figure 8:
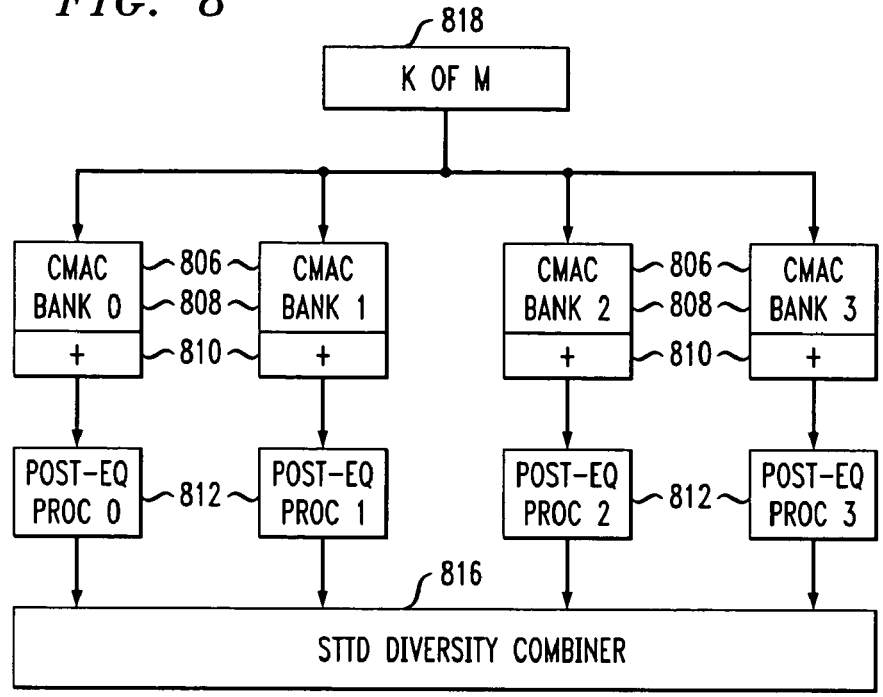
FIG. 8 is a block diagram depicting operation of the circuit of FIG. 7 in a first operating mode.
Figure 9:
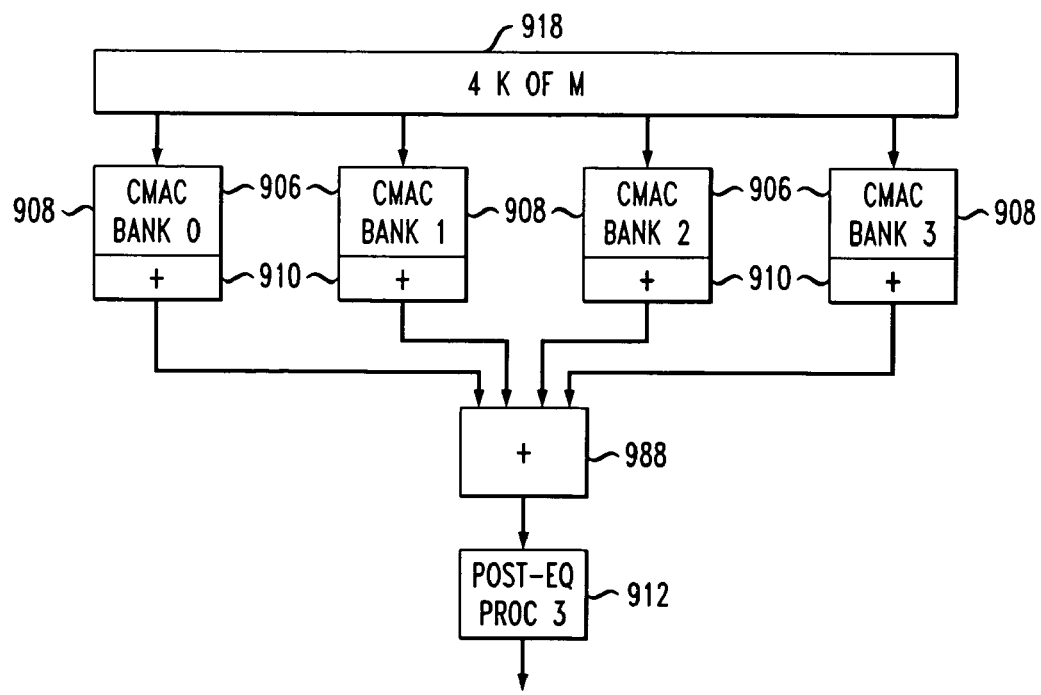
FIG. 9 is a block diagram depicting operation of the circuit of FIG. 7 in another operating mode.

Still referring to FIG. 7, and viewing now also FIG. 9, in another alternative mode of operation of the circuit of FIG. 7, each of the equalizer filter portions 706 is connected to the fourth post-equalizer processor 712 through the complex adder configuration formed by complex adders 762, 764, 766, with multiplexer 774 and 776 selecting the output of complex adders 762, 764 and multiplexer 778 selecting the output of complex adder 766. Element 988 in FIG. 9 corresponds to the complex adder configuration just described. The virtual delay line configuration for operation in the mode depicted in FIG. 9 includes 4K of M chips as depicted at block 918 (4K should be less than M). It will be appreciated that the first, second, third and fourth equalizer filter portions 906 effectively function as a single equalizer filter of quadruple length as compared to the length of the equalizer filter portions 706 in the first operating mode shown in FIG. 8 (i.e., FIG. 9 depicts a "long" configuration). For operation in the mode depicted in FIG. 9, control circuit 726 causes multiplexers 786, 728 to cause the output of the circuit to be taken directly from the fourth post-equalizer processor 712, 912. Control circuit 726 also sends appropriate commands to multiplexers 774, 776, 728 to select outputs of the complex adders 762, 764, 766 forming the complex adder configuration 988. Control circuit 726 also causes the reconfiguration of the input buffer module 718 in a manner similar to that described above with respect to FIG. 1.

Figure 10:
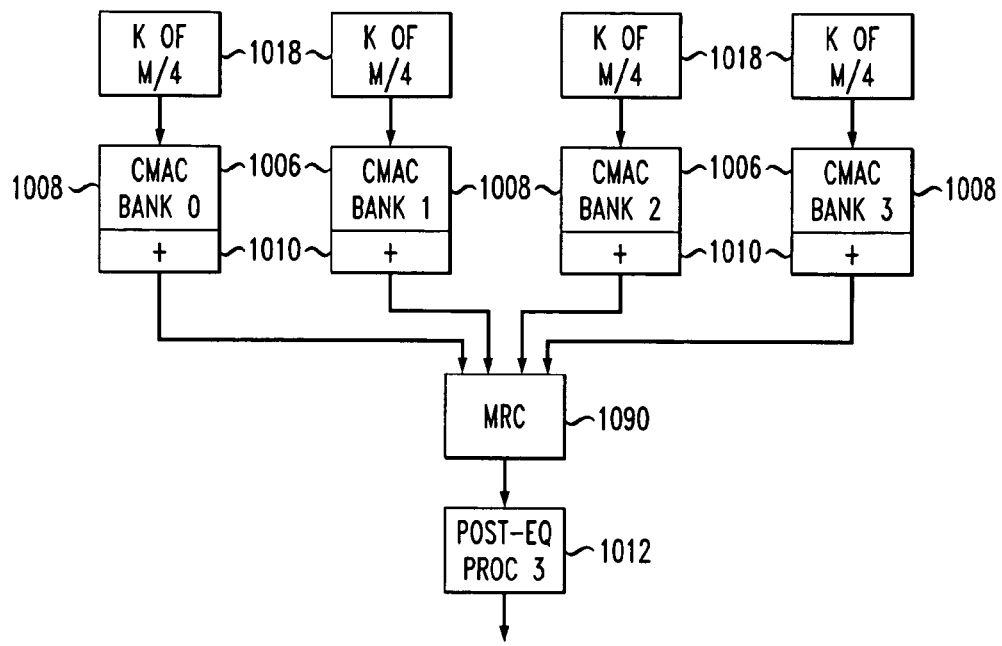
FIG. 10 is a block diagram depicting operation of the circuit of FIG. 7 in yet another operating mode.

With continued attention to FIG. 7, and turning also to FIG. 10, another possible mode of operation of the circuit of FIG. 7 is depicted. Such mode can be characterized as a simple 4-way diversity mode. In the operating modes depicted in FIG. 10, control circuit 726 configures combining circuit 714 in a maximum ratio combiner configuration employing maximum ratio combiners 768, 770, 772. Multiplexers 774, 776 select the outputs of maximum ratio combiners 768, 770, while multiplexer 778 selects the output of maximum ratio combiner 772, thus forming the maximum ratio combiner configuration depicted as element 1090 in FIG. 10. The multiplexers operate under the influence of control circuit 726. In this case, input buffer module 718 has a virtual delay line configuration including 4 delay lines, each in turn including K samples of one quarter of the M chips. This is suggested by elements 1018 in FIG. 10; the input buffer 722 of input buffer module 718 can be realized as four physical buffers, each connected to a separate antenna module as shown by the four antennas 742 in FIG. 7.

It will be appreciated that the circuit of FIG. 7 can be configured with L=2; for example, operating modes can be employed wherein the second and fourth post-equalizer processors 712 are employed. Combining circuit 714 can couple the outputs of the first and second equalizer filter portions 706 to the second post-equalizer processor 712 and the outputs of the third and fourth equalizer filter portions 706 to the output of the fourth post-equalizer processor 712. Such interconnection can be through, for example, either the two complex adders 762, 764 or the two maximum ratio combiners 768, 770 by selecting the output of these elements, respectively with multiplexer 774, 776 and then selecting the output of multiplexer 776 with multiplexer 778. Combiner 716 can be coupled to the second and fourth post-equalizer processors 712 by selecting their outputs with multiplexers 784, 786 respectively. All of the selections can be made under the influence of control circuit 726.

Figure 11:
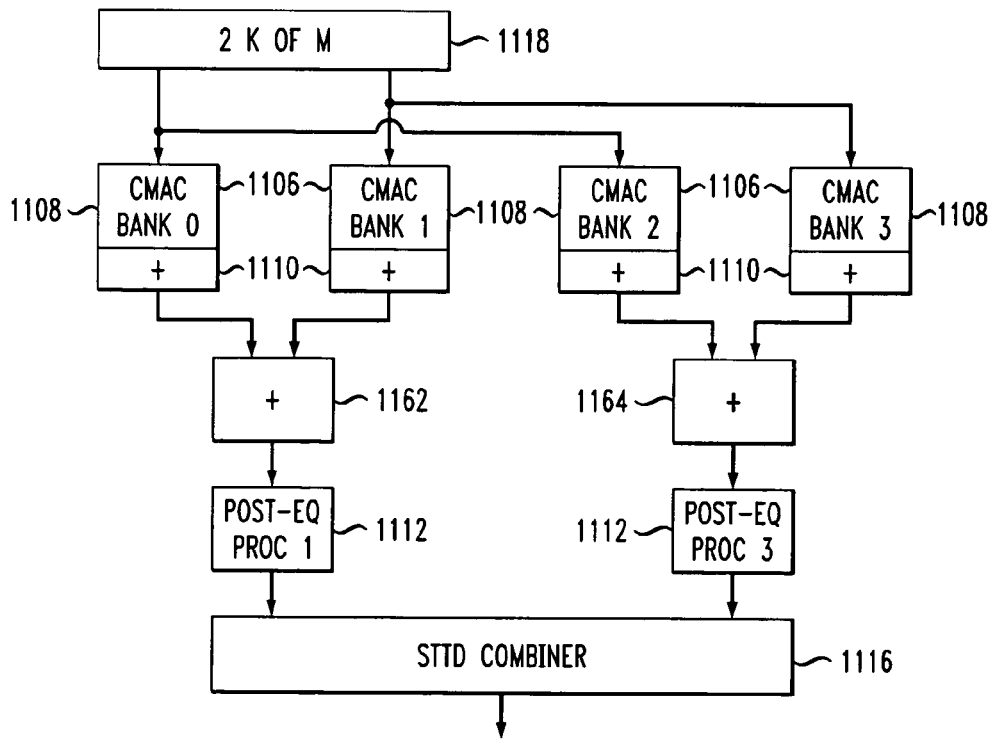
FIG. 11 is a block diagram depicting operation of the circuit of FIG. 7 in still another operating mode.

Still giving attention to FIG. 7, and addressing FIG. 11 as well, it will be appreciated that when complex adders 762, 764 are employed, the effective configuration depicted in FIG. 11 results. The input buffer module 718 can form a virtual delay line 1118 holding 2K samples of M chips. Multiplexer 728 selects the output of combiner 716. It will be appreciated that the first and second equalizer filter portions 1106 effectively function as a single equalizer filter of double length compared to the length of the first and second equalizer filter portions in the first operating mode, and the third and fourth equalizer filter portions similarly function as a single equalizer filter of double length compared to their length in the first operating mode as depicted in FIG. 8.

Figure 12:
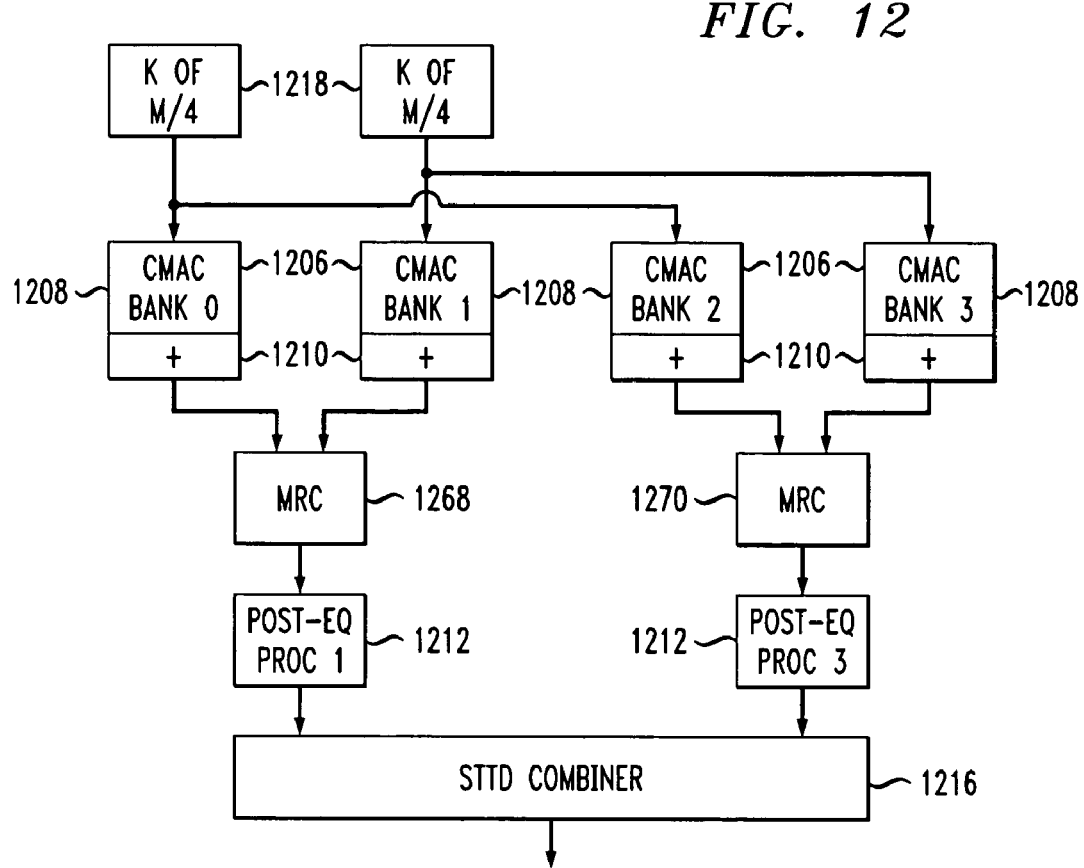
FIG. 12 is a block diagram depicting operation of the circuit of FIG. 7 in a further operating mode.

Remaining mindful of FIG. 7, and now considering FIG. 12, when the maximum ratio combiners 768, 770 are selected, the effective configuration shown in FIG. 12 results. The input buffer module 718 can form a virtual delay line configuration 1218 that include two delay lines each having K samples of one quarter of M chips. One of the delay lines can be coupled to the first and third equalizer filter portions while another of the delay lines can be coupled to the second and fourth equalizer filter portions.

Figure 13:
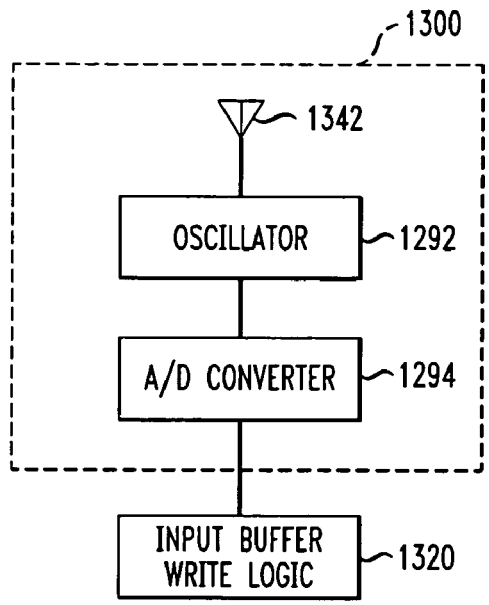
FIG. 13 is a block diagram of an antenna module suitable for use with the present invention.

Reference should now be had to FIG. 13. Elements similar to those in FIG. 1 and 7 have been incremented by 1200 and 600 respectively. The present invention can employ antenna modules, which include antennas 1342 and suitable interconnections to the corresponding input buffer write logic 1320. It will be appreciated that typically an oscillator 1292 and analog-to-digital converter 1294 are employed to process the signal received by antenna 1342 before it is input to the input buffer write logic 1320. Any of the communications circuits of the present invention, as described herein, can be formed as part of a larger communications apparatus with suitable antenna modules, such as antenna modules 1300, coupled to corresponding input ports of the input buffer write logic 120, 720. Such ports are suggested by the incoming arrows respectively in FIG. 1 and 7. Note that the configurations depicted in FIGS. 8, 9 and 11 employs a single antenna module, the configuration of FIG. 10 employs four antenna modules, and the configuration of FIG. 12 employs two antenna modules.

Figure 14:
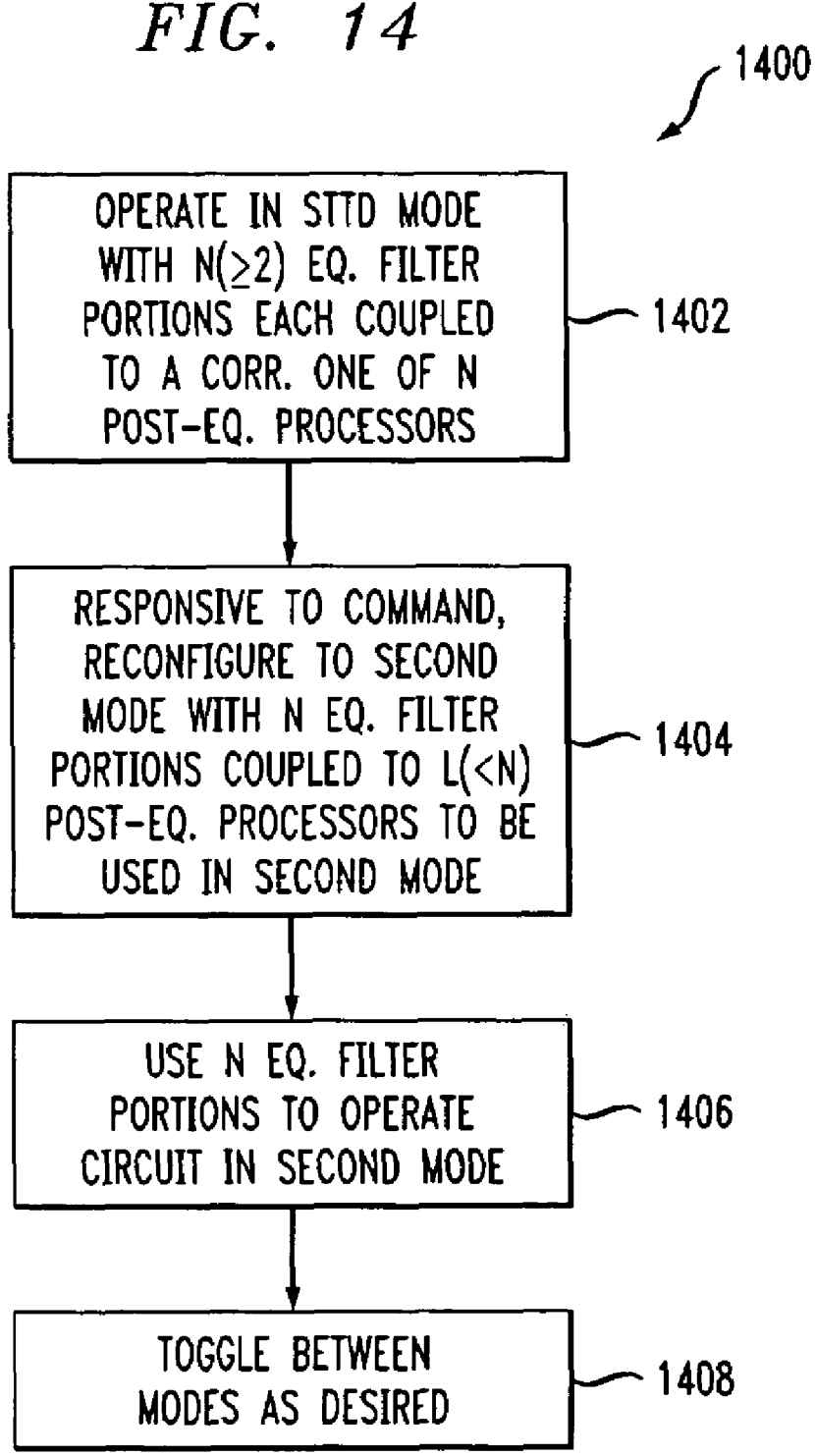
FIG. 14 is a flow chart depicting exemplary method steps for operating a communications circuit in accordance with an aspect of the present invention.

Reference should now be had to FIG. 14 which shows a flow chart 1400 depicting a method of operating a communications circuit in accordance with the present invention. At step 1402, the circuit is operated in a STTD mode configuration with N equalizer filter portions, N being greater than or equal to two, with each of the equalizer filter portions coupled to a respective one of N post-equalizer processors. At step 1404, responsive to a command, the circuit is reconfigured into a second mode where the N equalizer filter portions are coupled to L, less then N, post-equalizer processors to be used in the second mode configuration. At step 1406, the N equalizer filter portions are employed to operate the circuit in the second mode. Step 1408 indicates that one can toggle back and forth between modes as desired, for example, upon receipt of further commands. Such ability to switch back and forth between the various operating modes/configurations may be advantageously employed in any of the circuits discussed herein.

At least a portion of the techniques of the present invention described herein may be implemented in an integrated circuit. In forming integrated circuits, a plurality of identical die are typically fabricated in a repeated pattern on a surface on a semi-conductor wafer. Each die can include an entire circuit or elements as described herein, and can include other structures or circuits. The individual die are cut or diced from the wafer, and then packaged as an integrated circuit. One skilled in the art will know how to dice wafers and package die to produce integrated circuits. Integrated circuits so manufactured are considered part of this invention.

Although illustrative embodiments of the present invention have been described herein, it is to be understood that the invention is not limited to those precise embodiments, and that various other changes and modifications may be made by one skilled in the art without departing from the scope of the invention as set forth in the appended claims.

We claim:

1. A communications circuit operable in at least first and second operating modes, said circuit comprising:
   N equalizer filter portions, each having an equalizer filter portion output, N being an integer at least equal to two;
   N post-equalizer processors, each having a post-equalizer processor input and a post-equalizer processor output;
   a combining circuit that is interconnected between said equalizer filter portion outputs and said post-equalizer processor inputs and that is configurable to:
      couple each of said N equalizer filter portion outputs to a corresponding one of said N post-equalizer processor inputs for said first operating mode; and
      couple said equalizer filter portion outputs to L post-equalizer processor inputs of L of said N post-equalizer processors that are to be used for said second operating mode, L being an integer less than N; and
   a control circuit that is coupled to said combining circuit and is configured to cause said combining circuit to switch between at least said first and second operating modes in response to an instruction.

2. The communications circuit of claim 1, wherein said circuit is formed as an integrated circuit.

3. The communications circuit of claim 1, wherein L=1.

4. The communications circuit of claim 1, wherein L is an even integer, and wherein said combining circuit is configurable to couple an equal number of said equalizer filter portion outputs to each of said L post-equalizer processor inputs during said second operating mode.

5. The communications circuit of claim 1, wherein said combining circuit is configurable, and L is preselected, based on an engineering tradeoff between performance and power consumption.

6. The communications circuit of claim 1, wherein:
   N=2; and
   L=1;
   said circuit further comprising a first mode combiner module configurable to be coupled to said N post equalizer processor outputs for said first operating mode.

7. The communications circuit of claim 6, wherein said equalizer filter portions have inputs, said communications circuit further comprising:
   an input buffer module coupled to said inputs of said equalizer filter portions, said input buffer module forming a virtual delay line that is reconfigurable between a first virtual delay line configuration associated with said first operating mode and a second virtual delay line configuration associated with said second operating mode.

8. A communications circuit operable in at least first and second operating modes, said circuit comprising:
   N equalizer filter portions, each having an equalizer filter portion output, N being an integer at least equal to two;
   N post-equalizer processors, each having a post-equalizer processor input and a post-equalizer processor output;
   a combining circuit that is interconnected between said equalizer filter portion outputs and said post-equalizer processor inputs and that is configurable to:
      couple each of said N equalizer filter portion outputs to a corresponding one of said N post-equalizer processor inputs for said first operating mode; and
      couple said equalizer filter portion outputs to L post-equalizer processor inputs of L of said N post-equalizer processors that are to be used for said second operating mode, L being an integer less than N;
   wherein:
   said equalizer filter portions have inputs;
   N=2; and
   L=1;
   said circuit further comprising:
      a first mode combiner module configurable to be coupled to said N post equalizer processor outputs for said first operating mode;
      an input buffer module coupled to said inputs of said equalizer filter portions, said input buffer module forming a virtual delay line that is reconfigurable between a first virtual delay line configuration associated with said first operating mode and a second virtual delay line configuration associated with said second operating mode; and
      a control circuit that is coupled to said input buffer module and said combining circuit, wherein:
   said first mode combiner module has a first mode combiner module output;
   said combining circuit comprises a combining circuit complex adder;
   said input buffer module contains M available data chips;
   said first virtual delay line configuration comprises K samples of said M chips;
   said second virtual delay line configuration comprises 2K samples of said M chips;
   said first and second equalizer filter portions are configurable to effectively function, for said second operating mode, as a single equalizer filter of double length as compared to a length of said first and said second equalizer filter portions for said first operating mode; and
   said control circuit is configurable to switch said input buffer module and said combining circuit between at least said first and second operating modes, and to cause the output of said communications circuit to be taken from: (i) said first mode combiner module output for said first operating mode, and (ii) said second post equalizer processor output for said second operating mode.

9. The communications circuit of claim 8, wherein:
   said input buffer comprises input buffer write logic coupled to said control circuit, an input buffer, and input buffer read logic coupled to said control circuit and said first and second equalizer filter portions;
   said first and second post-equalizer processors each comprise:
   a descrambler coupled to a respective one of said first and second post-equalizer processor inputs;
   a despreader coupled to said descrambler, said despreader having a despreader output;
   a channel estimator coupled to said respective one of said post-equalizer processor inputs, said channel estimator having a channel estimator output;
   a symbol derotator coupled to said channel estimator output and said despreader output; and
   a demapper coupled to said symbol derotator and having a demapper output coupled to a respective one of said first and second post-equalizer processor outputs; and
   said combining circuit complex adder has first and second input ports coupled respectively to said first equalizer filter portion output and said second equalizer filter portion output, and an output port that is selectively coupled to said second post-equalizer processor input.

10. A communications circuit operable in at least first and second operating modes, said circuit comprising:

N equalizer filter portions, each having an equalizer filter portion output, N being an integer at least equal to two;

N post-equalizer processors, each having a post-equalizer processor input and a post-equalizer processor output;

a combining circuit that is interconnected between said equalizer filter portion outputs and said post-equalizer processor inputs and that is configurable to:
 couple each of said N equalizer filter portion outputs to a corresponding one of said N post-equalizer processor inputs for said first operating mode; and
 couple said equalizer filter portion outputs to L post-equalizer processor inputs of L of said N post-equalizer processors that are to be used for said second operating mode, L being an integer less than N;

wherein:
said equalizer filter portions have inputs;
N=2; and
L=1;
said circuit further comprising:
 a first mode combiner module configurable to be coupled to said N post equalizer processor outputs for said first operating mode;
 an input buffer module coupled to said inputs of said equalizer filter portions, said input buffer module forming a virtual delay line that is reconfigurable between a first virtual delay line configuration associated with said first operating mode and a second virtual delay line configuration associated with said second operating mode; and
 a control circuit that is coupled to said input buffer module and said combining circuit, wherein:
said input buffer is configurable with first and second signal ports for receiving first and second signals from first and second antennas external to said communications circuit;
said first mode combiner module has a first mode combiner module output;
said combining circuit comprises a combining circuit maximum ratio combiner;
said input buffer module contains M available data chips;
said first virtual delay line configuration comprises K samples of said M chips;
said second virtual delay line configuration comprises two delay lines, each in turn comprising K samples of half of said M chips, one of said two delays lines being coupled to said first signal port and said first equalizer filter portion and another of said two delay lines being coupled to said second signal port and said second equalizer filter portion;
said second operating mode comprises a simple diversity configuration; and
said control circuit is configurable to switch said input buffer module and said combining circuit between at least said first and second operating modes, and to cause the output of said communication circuit to be taken from: (i) said first mode combiner module output for said first operating mode, and (ii) said second post equalizer processor output for said second operating mode.

11. The communications circuit of claim 10, wherein:
said input buffer comprises input buffer write logic implementing said first and second signal ports and being coupled to said control circuit, an input buffer, and input buffer read logic coupled to said control circuit and said first and second equalizer filter portions;

said first and second post-equalizer processors each comprise:
 a descrambler coupled to a respective one of said first and second post-equalizer processor inputs;
 a despreader coupled to said descrambler, said despreader having a despreader output;
 a channel estimator coupled to said respective one of said post-equalizer processor inputs, said channel estimator having a channel estimator output;
 a symbol derotator coupled to said channel estimator output and said despreader output; and
 a demapper coupled to said symbol derotator and having a demapper output coupled to a respective one of said first and second post-equalizer processor outputs; and
said combining circuit maximum ratio combiner has first and second input ports coupled respectively to said first equalizer filter portion output and said second equalizer filter portion output, and an output port that is selectively coupled to said second post-equalizer processor input.

12. The communications circuit of claim 8, operable in at least a third operating mode, wherein:
said input buffer is configurable with first and second signal ports for receiving first and second signals from first and second antennas external to said communications circuit;
said combining circuit further comprises a combining circuit maximum ratio combiner, said combining circuit complex adder being configurable to couple both said first and second equalizer filter portion outputs to said second post-equalizer processor input for said second operating mode, said combining circuit maximum ratio combiner being configurable to couple both said first and second equalizer filter portion outputs to a preselected one of said first and second post-equalizer processor inputs for said third operating mode;
said input buffer module forms said virtual delay line to be reconfigurable between said first virtual delay line configuration associated with said first operating mode, said second virtual delay line configuration associated with said second operating mode, and a third virtual delay line configuration associated with said third operating mode;
said third virtual delay line configuration comprises two delay lines, each in turn comprising K samples of half of said M chips, one of said two delays lines being coupled to said first signal port and said first equalizer filter portion and another of said two delay lines being coupled to said second signal port and said second equalizer filter portion;
said third operating mode comprises a simple diversity configuration; and
said control circuit is further configurable to switch said input buffer module and said combining circuit between said first, second and third operating modes, and to cause the output of said communication circuit to be taken from an output corresponding to said preselected one of said first and second post-equalizer processor inputs for said third operating mode.

13. The communications circuit of claim 12, wherein:
said input buffer comprises input buffer write logic implementing said first and second signal ports and being coupled to said control circuit, an input buffer, and input buffer read logic coupled to said control circuit and said first and second equalizer filter portions;

said first and second post-equalizer processors each comprise:
a descrambler coupled to a respective one of said first and second post-equalizer processor inputs;
a despreader coupled to said descrambler, said despreader having a despreader output;
a channel estimator coupled to said respective one of said post-equalizer processor inputs, said channel estimator having a channel estimator output;
a symbol derotator coupled to said channel estimator output and said despreader output; and
a demapper coupled to said symbol derotator and having a demapper output coupled to a respective one of said first and second post-equalizer processor outputs;
said combining circuit complex adder has first and second input ports coupled respectively to said first equalizer filter portion output and said second equalizer filter portion output, and an output port that is selectively coupled to said second post-equalizer processor input; and
said combining circuit maximum ratio combiner has first and second input ports coupled respectively to said first equalizer filter portion output and said second equalizer filter portion output, and an output port that is selectively coupled to said preselected one of said first and second post-equalizer processor inputs.

14. The communications circuit of claim 1, said circuit being configurable to produce a communications circuit output, wherein:
N=4;
L=1; and
said combining circuit is configurable to couple all of said first, second, third and fourth equalizer filter portion outputs to said fourth post-equalizer processor input for said second operating mode;
said communications circuit further comprising a first mode combiner module that is configurable to be coupled to said first, second, third and fourth post-equalizer processor outputs for said first operating mode.

15. A communications circuit operable in at least first and second operating modes, said circuit being configurable to produce a communications circuit output, said circuit comprising:
N equalizer filter portions, each having an equalizer filter portion output, N being an integer at least equal to two;
N post-equalizer processors, each having a post-equalizer processor input and a post-equalizer processor output;
a combining circuit that is interconnected between said equalizer filter portion outputs and said post-equalizer processor inputs and that is configurable to:
couple each of said N equalizer filter portion outputs to a corresponding one of said N post-equalizer processor inputs for said first operating mode; and
couple said equalizer filter portion outputs to L post-equalizer processor inputs of L of said N post-equalizer processors that are to be used for said second operating mode, L being an integer less than N;
wherein:
N=4;
L=1; and
said combining circuit is configurable to couple all of said first, second, third and fourth equalizer filter portion outputs to said fourth post-equalizer processor input for said second operating mode;
said communications circuit further comprising:
a first mode combiner module that is configurable to be coupled to said first, second, third and fourth post-equalizer processor outputs for said first operating mode;
an input buffer module coupled to said first, second, third and fourth equalizer filter portions, said input buffer module forming a virtual delay line that is reconfigurable between a first virtual delay line configuration for said first operating mode and a second virtual delay line configuration for said second operating mode; and
a control circuit that is coupled to said input buffer module and said combining circuit, wherein:
said first mode combiner module has a first mode combiner module output;
said combining circuit comprises a combining circuit complex adder configuration;
said input buffer module contains M available data chips;
said first virtual delay line configuration comprises K samples of said M chips;
said second virtual delay line configuration comprises 4K samples of said M chips;
said first, second, third and fourth equalizer filter portions are configurable to effectively function, for said second operating mode, as a single equalizer filter of quadruple length as compared to a length of said first, second, third and fourth equalizer filter portions for said first operating mode; and
said control circuit is configurable to switch said input buffer module and said combining circuit between at least said first and second operating modes, and to cause the communications circuit output to be taken from: (i) said first mode combiner module output for said first operating mode, and (ii) said fourth post equalizer processor output for said second operating mode.

16. A communications circuit operable in at least first and second operating modes, said circuit being configurable to produce a communications circuit output, said circuit comprising:
N equalizer filter portion, each having an equalizer filter portion output, N being an integer at least equal to two;
N post-equalizer processors, each having a post-equalizer processor input and a post-equalizer processor output;
a combining circuit that is interconnected between said equalizer filter portion outputs and said post-equalizer processor inputs and that is configurable to:
couple each of said N equalizer filter portion outputs to a corresponding one of said N post-equalizer processor inputs for said first operating mode; and
couple said equalizer filter portion outputs to L post-equalizer processor inputs of L of said N post-equalizer processors that are to be used for said second operating mode, L being an integer less than N;
wherein:
N=4;
L=1; and
said combining circuit is configurable to couple all of said first, second, third and fourth equalizer filter portion outputs to said fourth post-equalizer processor input for said second operating mode;
said communications circuit further comprising:
a first mode combiner module that is configurable to be coupled to said first second, third and fourth post-equalizer processor outputs for said first operating mode;
an input buffer module coupled to said first, second, third and fourth equalizer filter portions, said input buffer module forming a virtual delay line that is reconfigurable between a first virtual delay line configuration for said first operating mode and a second virtual delay line configuration for said second operating mode; and
a control circuit that is coupled to said input buffer module and said combining circuit, wherein:

said input buffer is configurable with first, second, third and fourth signal ports for receiving first, second, third and fourth signals from first, second, third and fourth antennas external to said communications circuit;

said first mode combiner module has a first mode combiner module output;

said combining circuit comprises a combining circuit maximum ratio combiner configuration;

said input buffer module contains M available data chips;

said first virtual delay line configuration comprises K samples of said M chips;

said second virtual delay line configuration comprises four delay lines, each in turn comprising K samples of one-quarter of said M chips, each of said four delays lines being respectively coupled to one of said first, second, third and fourth signal ports and one of said first, second, third and fourth equalizer filter portions;

said second operating mode comprises a simple diversity configuration; and said control circuit is configurable to switch said input buffer module and said combining circuit between at least said first and second operating modes, and to cause the communication circuit output to be taken from: (i) said first mode combiner module output for said first operating mode, and (ii) said fourth post equalizer processor output for said second operating mode.

17. The communications circuit of claim 1, said circuit being configurable to produce a communications circuit output, wherein:

N=4;

L=2; and said combining circuit is configurable to couple both said first and second equalizer filter portion outputs to said second post-equalizer processor input, and to couple both said third and fourth equalizer filter portion outputs to said fourth post-equalizer processor input, for said second operating mode;

said communications circuit further comprising a first mode combiner module that is configurable to be coupled to said first, second, third and fourth post-equalizer processor outputs for said first operating mode and to said second and fourth post-equalizer processor outputs for said second operating mode.

18. A communications circuit operable in at least first and second operating modes, said circuit being configurable to produce a communications circuit output, said circuit comprising:

N equalizer filter portions, each having an equalizer filter portion output, N being an integer at least equal to two;

N post-equalizer processors, each having a post-equalizer processor input and a post-equalizer processor output;

a combining circuit that is interconnected between said equalizer filter portion outputs and said post-equalizer processor inputs and that is configurable to:

couple each of said N equalizer filter portion outputs to a corresponding one of said N post-equalizer processor inputs for said first operating mode; and couple said equalizer filter portion outputs to L post-equalizer processor inputs of L of said N post-equalizer processors that are to be used for said second operating mode, L being an integer less than N;

wherein:

N=4;

L=2; and said combining circuit is configurable to couple both said first and second equalizer filter portion outputs to said second post-equalizer processor input, and to couple both said third and fourth equalizer filter portion outputs to said fourth post-equalizer processor input, for said second operating mode;

said communications circuit further comprising:

a first mode combiner module that is configurable to be coupled to said first, second, third and fourth post-equalizer processor outputs for said first operating mode and to said second and fourth post-equalizer processor outputs for said second operating mode;

an input buffer module coupled to said first, second, third and fourth equalizer filter portions, said input buffer module forming a virtual delay line that is reconfigurable between a first virtual delay line configuration for said first operating mode and a second virtual delay line configuration for said second operating mode; and a control circuit that is coupled to said input buffer module and said combining circuit, wherein:

said combining circuit comprises two combining circuit complex adders;

said input buffer contains M available data chips;

said second virtual delay line configuration comprises 2K samples of said M chips; and said control circuit is configurable to switch said input buffer module, said first mode combiner module, and said combining circuit between at least said first and second operating modes.

19. A communications circuit operable in at least first and second operating modes, said circuit being configurable to produce a communications circuit output, said circuit comprising:

N equalizer filter portions, each having an equalizer filter portion output, N being an integer at least equal to two;

N post-equalizer processors, each having a post-equalizer processor input and a post-equalizer processor output;

a combining circuit that is interconnected between said equalizer filter portion outputs and said post-equalizer processor inputs and that is configurable to:

couple each of said N equalizer filter portion outputs to a corresponding one of said N post-equalizer processor inputs for said first operating mode; and couple said equalizer filter portion outputs to L post-equalizer processor inputs of L of said N post-equalizer processors that are to be used for said second operating mode, L being an integer less than N wherein:

N=4;

L=2; and said combining circuit is configurable to couple both said first and second equalizer filter portion outputs to said second post-equalizer processor input, and to couple both said third and fourth equalizer filter portion outputs to said fourth post-equalizer processor input, for said second operating mode;

said communications circuit further comprising:

a first mode combiner module that is configurable to be coupled to said first, second, third and fourth post-equalizer processor outputs for said first operating mode and to said second and fourth post-equalizer processor outputs for said second operating mode;

an input buffer module coupled to said first, second, third and fourth equalizer filter portions, said input buffer module forming a virtual delay line that is reconfigurable between a first virtual delay line configuration for said first operating mode and a second virtual delay line configuration for said second operating mode; and a control circuit that is coupled to said input buffer module and said combining circuit, wherein:

said combining circuit comprises two combining circuit maximum ratio combiners;

said input buffer contains M available data chips;

said second virtual delay line configuration comprises two delay lines, each in turn comprising K samples of one quarter of said M chips, one of said delay lines being coupled to said first and third equalizer filter portions and another of said two delay lines being coupled to said second and fourth equalizer filter portions; and said control circuit is configurable to switch said input buffer module, said first mode combiner module, and said combining circuit between at least said first and second operating modes.

20. The communications circuit of claim 1, wherein said first operating mode is a space time transmit diversity (STTD) mode.

21. A method of operating a communications circuit comprising the steps of:

operating said circuit in a space time transmit diversity mode configuration wherein said circuit is configurable with N equalizer filter portions, N being an integer at least equal to two, each of said N equalizer filter portions being coupled to a respective one of N post equalizer processors;

reconfiguring said circuit, responsive to a command, into a second mode configuration wherein said N equalizer filter portions are coupled to L of said N post equalizer processors that are to be used in said second mode configuration, L being an integer less than N; and using said N equalizer filter portions to operate said circuit in said second mode configuration.

22. A communications apparatus operable in at least first and second operating modes, said apparatus comprising:

N equalizer filter portions, each having an equalizer filter portion input and an equalizer filter portion output, N being an integer at least equal to two;

N post-equalizer processors, each having a post-equalizer processor input and a post-equalizer processor output;

a combining circuit that is interconnected between said equalizer filter portion outputs and said post-equalizer processor inputs and that is configurable to:

couple each of said equalizer filter portion outputs to a corresponding one of said post-equalizer processor inputs for said first operating mode; and couple said N equalizer filter portion outputs to L post-equalizer processor inputs of L of said N post-equalizer processors that are to be used for said second operating mode, L being an integer less than N;

an input buffer module having N input ports and having N output ports coupled to said inputs of said equalizer filter portions, said input buffer module forming a virtual delay line that is reconfigurable between a first virtual delay line configuration associated with said first operating mode and a second virtual delay line configuration associated with said second operating mode;

a control circuit configurable to switch said input buffer module and said combining circuit between at least said first and second operating modes; and a plurality of antenna modules coupled to said input ports of said input buffer module.

* * * * *